Patented Apr. 24, 1945

2,374,494

UNITED STATES PATENT OFFICE 2,374,494

HALOGENATED KETALS AND PROCESS FOR PREPARING SAME

Glen H. Morey, Terre Haute, Ind., assignor to Commercial Solvents Corporation, Terre Haute, Ind., a corporation of Maryland No Drawing. Application January 27, 1940, Serial No. 315,971

14 Claims. (Cl. 260—613)

My invention relates to a new process for the preparation of ketals. More particularly it relates to a process for the production of ketals from both halogenated and unhalogenated ketones and monohydric alcohols, and to the ketals resulting from said halogenated ketones and monohydric alcohols. These new compositions may be represented by the following structural formula:

$$RC(OR^2)(OR^3)CXYR^1$$

in which R may be alkyl, haloalkyl, cycloalkyl, cyclohaloalkyl and aryl, $R^1$ represents hydrogen and alkyl, $R^2$ and $R^3$ may be alkyl, haloalkyl, methylenecycloalkyl or aralkyl, and X and Y are members of the group consisting of hydrogen or halogen. In the above formula, where the components $R^2$ and $R^3$ are alkyl, at least one of said components represent an alkyl group containing three or more carbon atoms, while the sum of the halogen atoms contained in and represented by the substituents R, X, and Y being an integer less than three at any time.

In the past ketals of the above-mentioned type have been prepared by the action of halogenated or unhalogenated ketones on alkyl orthoformates. This procedure, however, is particularly undesirable since orthoformic esters are, in general, comparatively expensive compounds and are obtained in relatively low yields from chloroform and the corresponding sodium alcoholate.

I have now discovered that such ketals of monohydric alcohols can be prepared directly from the halogenated or unhalogenated ketone and the alcohol under conditions which provide for the removal of water as it is formed during the reaction. In accordance with my process, the ketone and monohydric alcohols are dissolved in an inert, water immiscible organic solvent which is capable of forming a constant boiling mixture with water. This mixture is then heated to refluxing temperature in the presence of a polyhydroxy compound and/or an acid catalyst. The water formed during the reaction is removed as a constant boiling mixture and conducted into a suitable separator from which the water may be withdrawn and the water-immiscible layer returned to the reaction vessel. After approximately the theoretical amount of water has been removed, refluxing is discontinued, the inert solvent and unreacted materials distilled off from the reaction mixture and the crude product purified in accordance with any convenient method, for example, such as by fractional vacuum distillation. Ketals, obtained in this manner, are generally sufficiently pure for the majority of technical uses. However, if desired, they may be further purified by additional vacuum distillation, or by other well known methods, such as by subjecting these materials to various extraction procedures.

In regard to the removal of water from the zone of reaction, in the form of a constant boiling mixture, it is obvious that such a procedure may be utilized only in instances where said constant boiling mixture possesses a boiling point which is sufficiently lower than that of the ketone employed. When the water produced cannot be removed by means of a constant boiling mixture, without interfering with the reaction, suitable dehydrating agents such as anhydrous sodium sulfate, calcium sulfate, and the like may be employed.

Although the reaction involving the formation of ketals proceeds satisfactorily in the presence of an acid catalyst, the preferred embodiment of my invention consists of employing an aliphatic polyhydroxy compound in conjunction with the acid catalyst. The polyhydroxy compound is added to the mixture of the ketone, monohydric alcohol, acid, and water-immiscible solvent or solid dehydrating agent, in amounts corresponding to approximately 5 mole per cent of the ketone present. As this mixture is brought to refluxing temperature, the cyclic ketal of the ketone is formed. However, this product, in the presence of the monohydric alcohol, undergoes alcoholysis to form the corresponding ketal of the monohydric alcohol, which I have obtained on certain occasions, in yields as high as 85 per cent. Simultaneously the aliphatic hydroxy compound is regenerated and may be recovered in substantially quantitative amounts.

The monohydric alcohols, which are applicable to my invention, are any of the primary, secondary, or halogenated primary alcohols. Specific alcohols which may be satisfactorily employed are ethyl alcohol, ethylene chlorohydrin, propylene chlorohydrin, 2-ethyl-1-hexanol, secondary butyl alcohol, phenylethyl alcohol, cyclohexylcarbinol, etc.

The ketones utilized in carrying out my invention are represented by the general formula:

$$RCOCXYR^1$$

in which R may be either alkyl, cycloalkyl, haloalkyl, or cyclohaloalkyl or aryl, $R^1$ may be hydrogen or alkyl, and X and Y may be either halogen or hydrogen, the sum of the halogen atoms contained in and represented by the components R, X, and Y being less than three at any given instant. As examples of such compounds, which are included by the above formula, there may be mentioned the following ketones and their mono- and dihalogenated derivatives: acetone, methyl ethyl ketone, acetophenone, methyl cyclohexyl ketone, and the like.

It should be mentioned, in connection with the halogenated ketones which are applicable to my process, that not all halogenated ketones are operative therein. This peculiar property of halogenated ketones has been substantiated by the fact that I have found such ketones as 1,1,3-trichloroacetone to be incapable of reacting with monohydric alcohols to form the corresponding ketals under the above described conditions.

The catalysts utilized in my process constitute two different combinations, viz., the acid catalyst and the catalyst comprising an aliphatic polyhydroxy compound and an acid. The acid catalyst employed in my process may be any substance capable of giving a sufficiently strong acid reaction to promote ketalization and in this connection it is to be understood that the expression "acid catalyst" appearing hereinafter is to be interpreted as such. Acids which have been found to be particularly effective as catalysts for my process, are the mineral acids, such as hydrochloric acid, phosphoric acid, sulfuric acid, and the like. The aliphatic polyhydroxy compounds, which may be utilized, are any of such compounds which are capable of forming a cyclic ketal with the ketone employed, and it is to be understood that the expression "polyhydroxy compound," appearing in the appended claims, is to be construed as such. There may be mentioned, as examples of such polyhydroxy compounds, ethylene glycol, propylene glycol, 1,2-butyleneglycol, glycerol, and the like.

The water-immiscible organic materials, added to the reaction mixture, which function to remove the water as a constant boiling mixture, may be any of a large number of compounds. For example, such materials may be xylene, benzene, toluene, various petroleum hydrocarbons, and derivatives thereof, and the like; or in certain instances where the halogenated ketone or alcohol, employed in the reaction, is capable of forming a constant boiling mixture with water, an excess of the halogenated ketone or alcohol may be added to the reaction mixture, and thereby serve as a satisfactory means for removal of water from said mixture.

My invention may be further illustrated by the following specific examples:

Example I 2,2-(butoxy) 1,1-dichloropropane,

was prepared by introducing into a suitable reaction vessel, equipped with an efficient fractionating column, a mixture of 508 parts of unsymmetrical dichloroacetone, 740 parts of 1-butanol, 3.7 parts of concentrated sulfuric acid and 450 parts of benzene. The reaction mixture was brought to refluxing temperature, and the water formed in the reaction was distilled off in a constant boiling mixture with benzene. After the theoretical amount of water (72 parts) had been removed, the benzene was distilled off and the crude reaction product fractionated at 10 mm. The principal fraction obtained was collected at 73° C. (10 mm.) and amounted to 365 parts of the desired compound.

Example II

Four hundred and sixty-three parts of chloroacetone, 736 parts of ethyl alcohol, 260 parts of toluene, 16 parts of ethylene glycol, and 48 parts of concentrated hydrochloric acid, were placed in a suitable container and the mixture was refluxed. The mixture was then distilled until a total of 101 parts of water had been removed. The excess toluene and unreacted chloroacetone and ethyl alcohol were then distilled off and the remaining crude material fractionated. The major portion obtained, boiling at 81-82°(50 mm.) amounted to 530 parts of 2,2-(ethoxy) 1-chloropropane, corresponding to an 85% yield based on the chloroacetone.

The effect of the presence of polyhydroxy compounds such as ethylene glycol, propylene glycol, glycerol and the like as illustrated in Example II, on the ultimate yield of ketal, may readily be seen by the following example in which a strong mineral acid alone was used as the catalyst.

Example III 2,2-(ethoxyl)-1-chloropropane was prepared by reacting 925 parts of chloroacetone with 1380 parts of ethyl alcohol dissolved in 890 parts of benzene containing 60 parts of concentrated hydrochloric acid, in accordance with the procedure described in Example II. There was obtained 722 g. of 2,2-(ethoxy)-1-chloropropane corresponding to a yield of 55.6% of the theoretical amount based on the chloroacetone.

Example IV

Into a suitable vessel fitted with a fractionating column, were placed 871 parts of 2-ethyl-1-hexanol, 925 parts of chloroacetone, 30 parts of concentrated hydrochloric acid, and 450 parts of benzene. This mixture was brought to refluxing temperature and the water formed during the reaction was distilled off in a constant boiling mixture with the benzene. After 125 parts of water had been collected, the refluxing was discontinued and the benzene and unreacted starting materials distilled off under reduced pressure. The crude reaction product was then subjected to further distillation and the principal fraction boiling at 103° C. (12 mm.), which amounted to 456 parts, was collected. The resulting distillate was a water-white liquid consisting chiefly of 2,2-(2-ethylhexoxy)-1-chloropropane.

Example V

A mixture of 370 parts of chloroacetone, 805 parts of ethylene chlorohydrin, 450 parts of benzene, and 73 parts of 85 per cent phosphoric acid, were placed in a reaction kettle and heated to refluxing temperature. After 110 parts of water was collected in the form of a constant boiling mixture, the excess benzene was distilled off at atmospheric pressure. The entire crude product was then subjected to distillation under vacuum and a total of 156 parts was collected. This fraction boiled at 95-97° C. (50 mm.) and consisted principally of 2,2-(2-chloroethoxy)-1-chloropropane.

The halogenated ketals, produced in accordance with my invention, are in general water-white mobile liquids of agreeable odor, and are relatively stable at elevated temperatures. These products have been found to be suitable for use as solvents for various resin compositions, and are similarly suitable for use as intermediates in the preparation of numerous organic compounds, Other uses of such materials will be readily apparent to those skilled in the art.

It is to be understood that the above examples are not limitative but are merely illustrative of the process and products which lie within the scope of my invention. For example, in accordance with my process one may prepare mixed ketals by reacting a molecular excess of the ketone with a monohydric alcohol to form the corresponding hemi-ketal which may be in turn reacted with a different monohydric alcohol to form said mixed ketal.

My invention having now been described, what I claim is:

1. In a process for the preparation of ketals, the step which comprises reacting chloroacetone with ethyl alcohol in the presence of a catalyst comprising an acid and ethylene glycol, and continuously removing the water formed during the reaction.

2. In a process for the preparation of ketals, the step which comprises reacting unsymmetrical dichloroacetone with butyl alcohol in the presence of an acid catalyst, and continuously removing the water formed during the reaction.

3. In a process for the preparation of ketals, the step which comprises reacting chloroacetone with ethylene chlorohydrin in the presence of an acid catalyst and continuously removing the water formed during the reaction.

4. 2,2-(butoxy)-1,1-dichloropropane.

5. 2,2(2-chloroethoxy)-1-chloropropane.

6. 2,2-(2-ethylhexoxy)-1-chloropropane.

7. In the process of preparing ketals having the structural formula: $RC(OR^2)_2CXYR^1$ wherein R is a member of the group consisting of alkyl, haloalkyl, cycloalkyl, cyclohaloalkyl and aryl, $R^1$ is a member of the group consisting of hydrogen and alkyl; $R^2$ is a member of the group consisting of alkyl, aralkyl, haloalkyl and methylenecycloalkyl, while X and Y are members of the group consisting of halogen and hydrogen; the steps which comprise reacting a ketone having the structural formula $RCOCXYR^1$ with a monohydric alcohol having the formula $R^2OH$ in the presence of an acid catalyst, while continuously removing the water former during the reaction, the total number of halogen atoms present in said ketone being an integer less than three.

8. The process of claim 7 wherein said acid catalyst is a mineral acid.

9. The process of claim 7 wherein said acid catalyst is a mineral acid and a polyhydroxy organic compound capable of forming a cyclic ketal with said ketone.

10. The process of claim 7 wherein X represents halogen and Y represents hydrogen, said ketone being an alpha-monohalogenated ketone.

11. The process of claim 7 wherein both X and Y represent halogen, said ketone being an alpha-dihalogenated ketone.

12. In the preparation of halogenated ketals, the process which comprises reacting a chlorinated acetone containing from one to two chlorine atoms, with at least one monohydric alkyl alcohol in the presence of an acid catalyst, while continuously removing the water formed during the reaction.

13. The process of claim 12 wherein said alcohol is a halogenated alkyl alcohol.

14. The process of claim 12 wherein said chloracetone is unsymmetrical dichloracetone.

GLEN H. MOREY.